Sept. 8, 1959
B. SEEWACK
2,903,141
ADJUSTABLE BRACKET FOR A SHOWER ROD, CURTAIN HOLDER, OR THE LIKE
Filed June 21, 1954
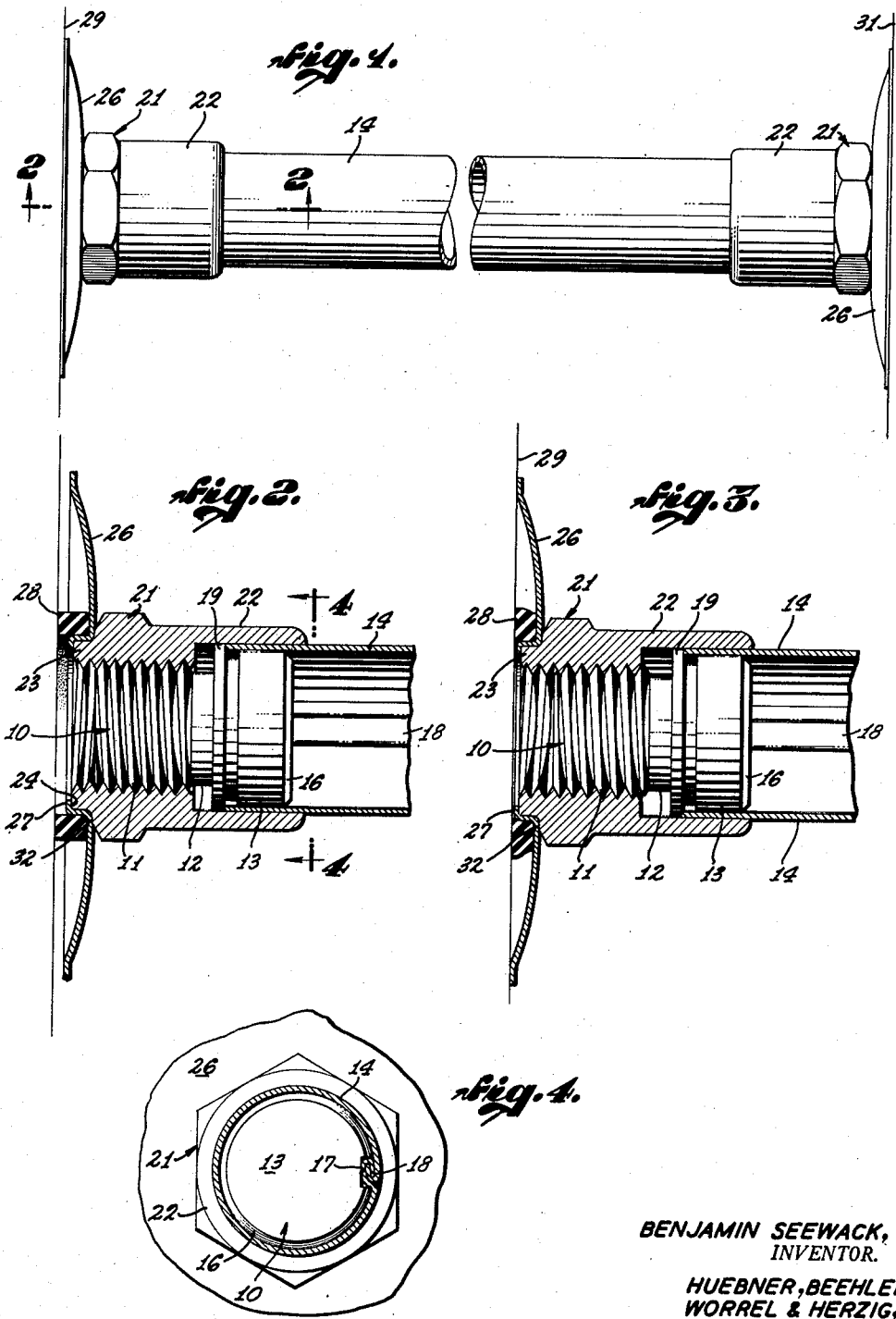
BENJAMIN SEEWACK,
INVENTOR.
HUEBNER, BEEHLER,
WORREL & HERZIG,
ATTORNEYS.
BY United States Patent Office 2,903,141
Patented Sept. 8, 1959

2,903,141
ADJUSTABLE BRACKET FOR A SHOWER ROD, CURTAIN HOLDER, OR THE LIKE

Benjamin Seewack, Los Angeles, Calif.

Application June 21, 1954, Serial No. 438,101

3 Claims. (Cl. 211—105.4)

The present invention relates to an adjustable bracket for a rod such as a shower curtain rod, a clothes hanger rod, a curtain holder or rod, or the like; and has as one of its objects the provision of an adjustable bracket for such rods which will permit the rapid and secure installation thereof between vertical walls in bathrooms, clothes closets and windows, for example, without the use of nails or screws. Another object of the invention is to provide such an adjustable bracket for such rods which will enable the rods to safely hold up very heavy loads without damaging the surfaces of supporting walls.

Broadly described the adjustable bracket of the invention comprises the following: A rod having a hollow or tubular portion on one end is provided with a bolt having its head dimensioned to fit snugly into the tubular portion so that the bolt threads are disposed coaxially with the rod and extend beyond the end thereof. The bolt, or rod, or both, are provided with means for maintaining the bolt in a relatively fixed radial relationship with the rod. These means may be a key and key way or a set screw, for example. In addition, either the bolt, rod, or both, are provided with means for limiting the movement of the bolt in the tubular portion of the rod along the axis thereof so that the bolt threads at all times extend beyond the end of the rod, even when great compressive force is exerted axially of the rod. This may be accomplished by providing the inner portion of the bolt head, or the bolt stem adjacent the head, with a stop means such as an annular collar or flange which is adapted to bear against the end of the rod. Finally, a nut is operatively associated with the bolt so that the nut moves axially of the bolt and the rod as it is turned on or off the bolt threads. Great compressive force can be applied axially along the rod between two walls, which are somewhat farther apart than the length of the rod, by turning a fully meshed nut off the bolt with a wrench. To protect the walls from damage the free end of the nut may be operatively associated with a disc to move axially of the rod with the nut as the nut is turned on the bolt.

A more detailed description of an embodiment of the adjustable bracket of the invention will be given with reference to the drawing wherein:

Figure 1 is an isometric side view showing one embodiment of the bracket of the invention supporting a rod;

Figure 2 is a sectional view taken on line 2—2 of Figure 1, and shows the bracket in an unmounted state;

Figure 3 is a view similar to that of Figure 2, and shows the bracket in a mounted state; and Figure 4 is a cross-sectional view taken on line 4—4 of Figure 2 but with a circumferential portion of disc 26 broken away.

The bolt 10 preferably consists of a short screw threaded section 11, a short neck 12 and a round head 13. The head 13 is made to have an outside diameter approximately equal to the inside diameter of hollow rod 14 so that it fits snugly inside the rod. The head 13 may be beveled as at 16 to facilitate insertion thereof into the end of rod 14. In addition, the rounded head may be knurled (not shown) to permit a tight friction gripping it in the rod.

A keyway 17 may be cut in the head 13 to accommodate a key, set screw, or other means to prevent bolt 10 from turning radially in the rod. In the particular embodiment shown in the drawing, the hollow rod 14 is made with an internally folded seam 18 which is accommodated by keyway 17 and locks the bolt against turning in the rod.

To stop the bolt 10 in the hollow end of the rod so that the threaded section 11 protrudes from the end thereof, an annular collar or flange 19 of an outside diameter approximately equal to the outside diameter of the rod 14 is formed or fixed preferably adjacent the inner surface of the head 13. This flange 19 bears evenly against the edge at the end of rod 14 and serves as the desired stop means for the bolt. In addition, the flange 19 serves to rigidly hold bolt 10 in axial alignment with rod 14 even when very great moments of force are applied to the rod while bolt 10 is held in fixed position.

A nut 21, having screw threads to receive those of section 11 of bolt 10, and having formed thereon a tubular extension 22 having an inside diameter approximately equal to the outside diameter of the rod 14, is journaled on bolt 10 as shown. When the nut is fully turned up on bolt 10, the tubular extension 22 telescopes over the end of rod 14 to rigidly and firmly hold the rod in a tight socket of smooth, neat appearance and simple design. The nut 21 has formed thereon a block, as shown, to accommodate the jaws of a wrench (not shown) for turning the nut off of bolt 10 to thereby mount the rod and bracket assembly between two vertical walls.

In addition, nut 21 has formed on its outer surface an annular extension or shoulder 23 which is designed to fit a well 24 formed in disc 26. The well 24 is made of smaller inside diameter than the outer dimensions of nut 21. The bottom of well 24 also preferably is provided with an internal annular flange 27, as shown in Figures 2 and 3. The disc 26 is preferably dished with its concave surface facing away from nut 21 when cooperatively associated therewith as shown in Figures 2 and 3.

A resilient frictional washer 28, preferably made of a rubbery material, is friction mounted on the outer walls of well 24. This washer, when so mounted, should extend somewhat beyond the plane of the edge of disc 26, as shown in Figure 2, when the rod and bracket are not mounted. When mounted between walls, indicated at 29 and 31, the nut 21 has been partially unscrewed from bolt 10 and bears tightly against the inner edges of disc 26 at flange 27 and shoulder 32. The resulting compressive force acting on washer 28 compresses it, as shown in Figure 3, so as to cause it to bear tightly and securely against wall 29 without damaging the latter. Should the outer edges of the disc 26 bear against the wall 29 they will not damage it because of the thinness and inherent flexibility of the disc.

To mount the bracket and rod assembly between two walls 29 and 31, the bolt head 13 is inserted into the hollow end of rod 14 and the threaded section 11 at the end of this assembly is introduced, while grasping the rod 14, into tubular extension 22 of nut 21. By turning the rod 14, and thus bolt 10, which turns therewith by reason of being locked in rod 14 through keyway 17 engaging seam 18, the bolt turns into threaded engagement with the nut 21. Initially the bolt is completely threaded into the nut and the disc 26 is mounted on shoulder 23 of the nut. Both ends of the rod are positioned adjacent the desired mounting points on walls 29 and 31 and nut 21 is unscrewed from bolt 10, preferably with the aid of a wrench applied to the nut, while the rod 14 is firmly held in position against rotation. After the washers 28, at both ends of the rod (only one washer is shown), engage the walls 29 and 31, respectively, continued unscrewing of nut 21 results in the application of a thrust against both walls through both washers. The nut 21 is unscrewed until this thrust compresses washer 28, as shown in Figure 3, to produce a perpetual thrust of the desired degree, and a resulting correspondingly firm and permanent mounting of rod 14 between walls 29 and 31.

The rod 14 may be provided with two adjustable brackets, as apparently shown in Figure 1, or it may be provided with only one bracket and a dummy having the outward appearance of a bracket but being devoid of some of the inner mechanism of the bracket, such as the bolt 10 and the internal threads of nut 21, for example.

In lieu of the washer 28 it has been found advantageous to employ a suction cup of rubber or the like, said cup having a diameter preferably equal to or greater than the outside diameter of said washer but of small enough diameter to nest within the flange 26. Such cup is preferably imperforate but may be provided with a socket to accommodate the reduced end or shoulder 23 of the nut.

Optionally, the hexagonal exterior surface of the nut 21, as shown, can be replaced or supplemented by a knurled band circumferentially thereof to provide a finger grip.

Although I have illustrated and described one embodiment of my invention, it is to be understood that many modifications thereof may be made within the scope of the appended claims without departing from the spirit of the invention.

What is claimed is:

1. A bracket for use with a threaded rod to support and clamp said rod between opposed walls, comprising; a bearing plate having a wall-engaging face with frictional wall gripping means thereon and having an outwardly facing recess defining an annular bearing and having a transverse thrust-receiving surface adjacent said recess but spaced outwardly from said face, a rotatable member having a pilot portion journalled in said recess with an end face portion thereof abutting said transverse surface with the inner end of said member spaced from said wall-engaging face, said rotatable member having a threaded portion concentric to said pilot portion, and a rod having threaded means fixed to an end thereof and threadedly engaging the threaded portion of said rotatable member whereby said rotatable member may be rotated in said bearing and thus exert thrust on said threaded rod without rotating either said rod or said bearing plate.

2. A bracket as defined in claim 1, wherein said bearing plate comprises an outwardly crowned dish-shaped sheet metal member having a central inwardly directed boss defining said recess, said wall gripping means comprising a ring of compressible friction material surrounding said boss and having a normal axial dimension greater than the depth of said dish-shaped member.

3. A bracket for use with a threaded rod to support and clamp said rod between opposed walls, comprising; a bearing plate having a wall-engaging face with frictional wall gripping means thereon and having an outwardly facing recess defining an annular bearing and having a transverse thrust-receiving surface adjacent said recess but spaced outwardly from said face, a rotatable member having a pilot portion journalled in said recess with an end face portion thereof abutting said transverse surface with the inner end of said member spaced from said wall-engaging face, said rotatable member having a threaded portion concentric to said pilot portion, and a rod having threaded means fixed to an end thereof and threadedly engaging the threaded portion of said rotatable member whereby said rotatable member may be rotated in said bearing and thus exert thrust on said threaded rod without rotating either said rod or said bearing plate, said threaded portion of said rotatable member comprising an internally threaded bore and a smooth counterbore portion at the outer end thereof, said rod being a hollow tube rotatably fitting said counterbore, said threaded means comprising a plug fixed in the end of said hollow tube in said counterbore and having a threaded axial extension.

References Cited in the file of this patent
UNITED STATES PATENTS

| | | |
|---|---|---|
| 763,844 | Benson | June 28, 1904 |
| 1,788,565 | Davis | Jan. 13, 1931 |
| 2,199,851 | Culver | May 7, 1940 |
| 2,312,185 | Neunherz | Feb. 23, 1943 |
| 2,519,827 | Duke | Aug. 22, 1950 |